Patented May 9, 1950

UNITED STATES PATENT OFFICE 2,506,921

TETRAHYDROFURFURYL ESTER SOLUTIONS OF HALOGENATED FLUORESCEINS

Siegfried Gottfried, Kenton, England.

No Drawing. Application November 5, 1947, Serial No. 784,313. In Great Britain December 24, 1946

7 Claims. (Cl. 167—85)

This invention relates to improved compositions containing halogenated fluoresceins. The compositions are suitable for use in the manufacture of compositions for colouring or staining the lips, face or other parts of the body and also for other purposes as hereinafter described.

Lip colouring compositions, e. g., lipsticks, as is known, ordinarily contain several ingredients, animal, vegetable, and synthetic oils, waxes, wool fats, halogenated fluoresceins, lakes and perfumes being commonly used lipstick raw materials.

The common practice employed in the lipstick art may be described as follows:

The ingredients comprising the wax base are usually melted together and agitated to assist solution. The halogenated fluorescein is separately dispersed in castor oil and enough of the wax base is added thereto so as to form a soft paste at room temperature. The paste is then ground through a roller or ointment mill. The balance of the wax base ingredients is then added, the entire contents being re-heated and stirred until the wax base has been dispersed. Perfume and/or other ingredients fulfilling particular functions may be added prior to pouring the contents into suitable moulds. The temperature of pouring is ordinarily about 10° C. above the solidifying point of the lipstick. The contents must be stirred continuously up to the point of pouring. After cooling below the solidification point, the lipstick is removed from the moulds.

In lipstick manufacture, castor oil is in general use because of its peculiar properties. It is used as a dispersing medium for halogenated fluoresceins. It is a thick, viscous oil, and among the most suitable of the vegetable and animal oils for use in lipsticks. It is considered to be a good solvent for halogenated fluoresceins; it is also miscible with animal and vegetable oils as well as true ester type waxes.

In spite of its very general use in lipstick manufacture, castor oil is disadvantageous in that its solubility for halogenated fluoresceins is low, at the most 1%.

It has been proposed to provide a liquid ingredient suitable for incorporation in lip-colouring compositions comprising tetrahydrofurfuryl alcohol and a halogenated fluorescein in solution therein. Experiments have shown, however, that tetrahydrofurfuryl alcohol is toxic. Thus, in experiments on rats, a dose of 6.3 gms. per kgm. body weight, via the stomach, was amply sufficient to kill all animals used, whilst a dose of 4.2 gms. per kgm. body weight, caused death in three out of four rats. The alcohol was a little less toxic when administered by subcutaneous injection.

Chronic toxicity tests were also carried out, three rats having their drinking water replaced by a 2% by volume aqueous solution of the alcohol over a period of 104 days. Over this period the rats absorbed 881, 603 and 502 ccs. of solution respectively, corresponding to 17.62, 12.06 and 8.06 ccs. of tetrahydrofurfuryl alcohol. The animals were all alive, but had not gained weight in any case, but had lost weight in some cases over the test period. The presence, therefore, of very small amounts of this substance in foodstuffs is likely to have slight deleterious effects.

In order to test possible deramatitic effects of tetrahydrofurfuryl alcohol, it was found that in applying a solution of 15% by weight of tetrahydrofurfuryl alcohol, 2% by weight of halogenated fluorescein, and 83% by weight of a mixture of equal proportions of castor oil and mineral oil to patients prone to dermatitis, 17 out of 100 showed reddening of the skin, and 27 out of 100 showed marked erythema of the lips accompanied by oedema (swelling).

Further tests were also carried out by applying neat tetrahydrofurfuryl alcohol to the skin to 100 subjects without choice to any particular susceptibility to dermatitis, and over 80% showed erythema of the skin, and all showed acute erythema and oedema of the lips when applied thereto. Furthermore, lipsticks were made containing tetrahydrofurfuryl alcohol and tetrabromofluorescein and 8 out of 100 showed allergic symptoms. Seven out of 100 showed a similar reaction when the same formula was used but omitting the tetrabromo-fluorescein.

It has now been discovered according to the present invention that a lipstick with improved properties can be obtained by replacing a part or the whole of the castor oil customarily employed by a tetrahydrofurfuryl ester particularly tetrahydrofurfuryl acetate, stearate, oleate, ricinoleate, palmitate or borate without producing the toxic or dermatitic effects observed when using tetrahydrofurfuryl alcohol.

Accordingly the present invention provides a composition comprising a halogenated fluorescein dissolved in a tetrahydrofurfuryl ester.

It has further been discovered that such compositions in addition to being suitable for the manufacture of improved lipsticks are also suitable for the manufacture of other compositions for use in colouring or staining the lips, face and other parts of the body, such as so-called panchromatic make-ups and colouring make-ups, as well as theatrical make-ups, cinema and screen make-ups in liquid form, cream form, ointment form, or compact form, for colouring or staining lips, face, or the whole body.

The present invention also includes a lipstick or like composition for colouring or staining the lips, face or other parts of the body comprising a fatty or oily base, and a solution of a halogenated fluorescein in a tetrahydrofurfuryl ester.

The compositions are also suitable for use in the manufacture of preparations for colouring wood and textiles and textile fibres, both natural and synthetic, e. g., wool, cotton, silk, rayon and nylon fibres and textiles.

Furthermore, the compatability of the compositions according to the invention with mineral oils and other hydrocarbons is satisfactory.

The compositions of the present invention enable castor oil to be completely eliminated as an ingredient of lipsticks and the like if desired, whilst the use of tetrahydrofurfuryl esters has the further advantage of giving superior staining power (due probably to the superior solubility for halogenated fluoresceins), a greater durability in use and greater plasticity without causing crumbling on the lips or other parts of the body.

Secondary solvents may be employed in addition to the tetrahydrofurfuryl esters. Examples of such secondary solvents are Carbitol, 1.5-pentane diol, glyceryl monoricinoleate, diethyl tartrate and esters of furoic acid such as ethyl furoate.

One of the very important advantages obtained by the use of tetrahydrofurfuryl esters is their superior solubility for halogenated fluorescein. Whereas not more than one part by weight of tetrabromofluorescein will dissolve in one hundred parts of castor oil, at least fifteen parts of the halogenated fluorescein will dissolve in one hundred parts of tetrahydrofurfuryl acetate or tetrahydrofurfuryl stearate at 60° C., whilst even tetrahydrofurfuryl ricinoleate dissolves to the extent of 5% at this temperature. The increased solubility of the halogenated fluorescein in tetrahydrofurfuryl acetate and/or other tetrahydrofurfuryl esters results in lipsticks of increased colour intensity when applied to the skin. This is probably because the halogenated fluorescein is in solution. When castor oil is used by itself, only a half or one per cent of the halogenated fluorescein is in solution. The undissolved halogenated fluorescein is not as effective in its staining power as it would be were it dissolved.

The increased colour and shade imparted to the lipsticks, as well as their staining properties, by the use of tetrahydrofurfuryl esters, renders it possible to reduce substantially any irritation which may be associated with lipsticks containing halogenated fluorescein. This is brought about by the very much smaller proportion of halogenated fluorescein which is required. There is, however, a very much more important additional and contributory factor to the material reduction in irritation when the tetrahydrofurfuryl ester is used. This arises from the fact that the halogenated fluorescein is dissolved in the ester and is in a form conducive to less irritability than were it in the undissolved, dispersed, or solid form.

Another factor worthy of note is that the rapidity of stain development of the lips is greater in lipsticks containing tetrahydrofurfuryl esters such as tetrahydrofurfuryl acetate. This invention also simplifies the process of making lipsticks and the like because a solution of the halogenated fluorescein in a tetrahydrofurfuryl ester can be stored indefinitely without necessitating any agitation before use. In the manufacture of lipstick in the usual way, it has been necessary to use either freshly prepared halogenated fluorescein dispersions, or to agitate them before use in lipsticks. In addition, the process of the present invention permits a simple heating together of the ingredients, preferably at temperatures of at least 60° C. without continual agitation thereof during the lipstick manufacture. The high solubilities of halogenated fluoresceins in tetrahydrofurfuryl ester such as tetrahydrofurfuryl acetate was unexpected, which can the more readily be realised by measuring the weight of tetrabromofluorescein which dissolves in 100 parts by weight of the material tested at 60° C.:

Methyl lactate, 1% soluble
Castor oil, less than 1% soluble
Diethylene glycol monostearate, less than 1% soluble
Glyceryl alpha methyl ether, 2% soluble
Propylene glycol mono ether of capric acid, 1% completely soluble, and less than 2% soluble
Tetrahydrofurfuryl acetate, 20% completely soluble The term "halogenated fluorescein" as used herein refers to a compound obtainable by the reaction of a halogenated phthalic acid and resorcinol. Examples of halogenated fluoresceins are: 4.5-di-bromo-3.6-fluoran-diol; 2.4.5.7-tetrabromo-12,13.14.15 - tetra-chloro-3.6-fluoran-diol; 4.5-di-chloro - 3.6 - fluoran - diol; 2.4.5.7-tetrabromo - 3.6 - fluoran - diol (tetra-bromo-fluorescein).

When desired, lakes or toners as well as oil-soluble colours may also be employed to obtain a desired shade. Furthermore, the use of a tetrahydrofurfuryl ester in a base mixture of wool-fats and hydrocarbons, commonly called adsorption bases, and the addition of a small proportion of Carbitol, stearic acid, Alcoholia Lanae, or di-phenyl tartrate, all of which act as blenders of the tetrahydrofurfuryl ester will, in addition to giving to the lipstick the solvent and staining properties hereinbefore referred to, also, with mixtures of the orthodox fats and waxes used in lipstick composition, give increased smoothness and idspersion to the additional lakes or toners added to the lipstick. These should be passed through a colloidal mill for positive dispersion.

Although lipsticks have been more particularly referred to for the purpose of illustrating the invention, it is understood that they are only a preferred embodiment of the invention, which extends to other lip colouring or staining compositions, as well as to face covering compositions, theatrical make-ups, and liquid compositions, creams, and rouges intended for colouring or staining the lipe, face, and the whole body.

The permissive and preferred amounts of the various ingredients used may vary within relatively wide limits. Based on lipstick compositions the proportion of halogenated fluorescein may vary between one-half and 10% by weight, although proportions of from one-half to 2% by weight are ordinarily used. The proportion of castor oil, if used, may vary from 10 to 50% by weight. Where secondary solvents are used, the proportions thereof are of the same order. The tetrahydrofurfuryl ester may be used in proportions of from 5 to 25% by weight.

The following examples, in which the parts are by weight, illustrate how lipsticks may be prepared according to the present invention:

1. 2 parts of 4.5-di-bromo-3.6-fluoran-diol were dissolved in 10 parts of tetrahydrofurfuryl acetate at 70° C. and the solution was added to a mixture of 40 parts of beeswax, 20 parts of castor oil, 20 parts of cocoa butter, 5 parts of anhydrous lanoline, 0.1 part of p-hydroxy benzoic acid (anti-oxidant), and sufficient carmine lake (inert pigment) to give the desired colour, and the whole was heated under agitation to a temperature sufficient to melt the wax (about 70° C.). After a clear solution was obtained this was cooled to about 65° C. and then poured into chilled moulds. The resulting lipsticks were removed from the moulds in the usual manner, no stirring being necessary after the clear solution was obtained.

2. Lipsticks were prepared as described in Example 1 using the following ingredients in the following proportions:

| | Parts |
|---|---|
| Beeswax | 40 |
| Tetrahydrofurfuryl acetate | 30 |
| Cocoa butter | 20 |
| Anhydrous lanoline | 5 |
| 2.3.5.7 - tetra-bromo - 12.13.14.15 - tetra-chloro-3.6-fluoran-diol | 2 |
| p-Hydroxy benzoic acid | 0.1 |
| Carmine lake (inert pigment) q. s. | |

3. Lipsticks were prepared as described in Example 1 using the following ingredients in the following proportions:

| | Parts |
|---|---|
| Beeswax | 40 |
| Tetrahydrofurfuryl stearate | 15 |
| Castor oil | 15 |
| Cocoa butter | 20 |
| Anhydrous lanoline | 5 |
| 4.5-Di-chloro-3.6-fluoran-diol | 2 |
| p-Hydroxy benzoic acid | 0.1 |
| Carmine lake (inert pigment), q. s. | |

4. Lipsticks were prepared as described in Example 1 using the following ingredients in the following proportions:

| | Parts |
|---|---|
| Beeswax | 40 |
| Tetrahydrofurfuryl stearate | 30 |
| Cocoa butter | 20 |
| Anhydrous lanoline | 5 |
| 2.4.5.7-Tetra-bromo-3.6-fluoran-diol | 2 |
| p-Hydroxy-benzoic acid | 0.1 |
| Carmine lake (inert pigment), q. s. | |

5. Lipsticks were prepared as described in Example 1 using the following ingredients in the following proportions:

| | Parts |
|---|---|
| Beeswax | 40 |
| Tetrahydrofurfuryl oleate | 15 |
| Castor oil | 15 |
| Cocoa butter | 20 |
| Anhydrous lanoline | 5 |
| 4.5-Di-bromo-3.6-fluoran-diol | 2 |
| p-Hydroxy benzoic acid | 0.1 |
| Carmine lake (inert pigment), q. s. | |

6. Lipsticks were prepared as described in Example 1 using the following ingredients in the following proportions:

| | Parts |
|---|---|
| Beeswax | 40 |
| Tetrahydrofurfuryl oleate | 30 |
| Cocoa butter | 20 |
| Anhydrous lanoline | 5 |
| 2.4.5.7 - Tetra-bromo - 12.13.14.15 - tetra-chloro-3.6-fluoran-diol | 2 |
| p-Hydroxy benzoic acid | 0.1 |
| Carmine lake (inert pigment), q. s. | |

7. Lipsticks were prepared as described in Example 1 using the following ingredients in the following proportions:

| | Parts |
|---|---|
| Beeswax | 40 |
| Tetrahydrofurfuryl ricinoleate | 15 |
| Castor oil | 15 |
| Cocoa butter | 20 |
| Anhydrous lanoline | 5 |
| 4.5-Di-chloro-3.6-fluoran-diol | 2 |
| p-Hydroxy benzoic acid | 0.1 |
| Carmine lake (inert pigment), q. s. | |

8. Lipsticks were prepared as described in Example 1 using the following ingredients in the following proportions:

| | Parts |
|---|---|
| Beeswax | 40 |
| Tetrahydrofurfuryl ricinoleate | 30 |
| Cocoa butter | 20 |
| Anhydrous lanoline | 5 |
| 2.4.5.7-Tetra-bromo-3.6-fluoran-diol | 2 |
| p-Hydroxy benzoic acid | 0.1 |
| Carmine lake (inert pigment), q. s. | |

9. Lipsticks were prepared as described in Example 1 using the following ingredients in the following proportions:

| | Parts |
|---|---|
| Beeswax | 40 |
| Tetrahydrofurfuryl palmitate | 15 |
| Castor oil | 15 |
| Cocoa butter | 20 |
| 4.5-Di-bromo-3.6-fluoran-diol | 2 |
| Anhydrous lanoline | 5 |
| p-Hydroxy benzoic acid | 0.1 |
| Carmine lake (inert pigment), q. s. | |

10. Lipsticks were prepared as described in Example 1 using the following ingredients in the following proportions:

| | Parts |
|---|---|
| Beeswax | 40 |
| Tetrahydrofurfuryl palmitate | 30 |
| Cocoa butter | 20 |
| Anhydrous lanoline | 5 |
| 2.4.5.7-Tetra-bromo-12.13.14.15-tetra-chloro-fluoran-diol | 2 |
| p-Hydroxy benzoic acid | 0.1 |
| Carmine lake (inert pigment), q. s. | |

11. Lipsticks were prepared as described in Example 1 using the following ingredients in the following proportions:

| | Parts |
|---|---|
| Beeswax | 40 |
| Tetrahydrofurfuryl borate | 15 |
| Castor oil | 15 |
| Cocoa butter | 20 |
| Anhydrous lanoline | 5 |
| 4.5-Di-chloro-3.6-fluoran-diol | 2 |
| p-Hydroxy benzoic acid | 0.1 |
| Carmine lake (inert pigment), q. s. | |

12. Lipsticks were prepared as described in Example 1 using the following ingredients in the following proportions:

| | Parts |
|---|---|
| Beeswax | 40 |
| Tetrahydrofurfuryl borate | 30 |
| Cocoa butter | 20 |
| Anhydrous lanoline | 5 |
| 2.4.5.7-Tetra-bromo-3.6-fluoran-diol | 2 |
| Carmine lake (inert pigment), q. s. | |
| p-Hydroxy benzoic acid | 0.1 |

The Carmine Lake used in the above examples was an insoluble azo pigment of the lithol red type made by Imperial Chemical Industries Ltd.

13. Lipsticks were prepared as described in Example 1 using the following ingredients in the following proportions:

| | Parts |
|---|---|
| Beeswax | 40 |
| Tetrahydrofurfuryl acetate | 30 |
| Cocoa butter | 20 |
| Anhydrous lanoline | 5 |
| 4.5-Di-bromo-3.6-fluoran-diol | 3 |
| 2.4.5.7-Tetra-bromo-3.6-fluoran-diol | 1 |
| p-Hydroxy benzoic acid | 0.1 |
| Perfume, flavour and saccharin, q. s. | |

This composition, which does not contain a lake, is pale orange in colour but when applied to the lips they assume a brilliant red colour.

The addition of a small proportion of tartaric acid renders the lipstick even paler in appearance without affecting the colour obtained on the lips.

It will be understood that in any of the above examples other halogenated fluoresceins, inert lakes and anti-oxidants may be substituted for those specified, for example esters of p-hydroxy benzoic acid such as the products known under the trade names "Nipasol" and "Nipagin," while the fatty and waxy bases may also be varied.

A solvent absorption base consisting of 28 parts of anhydrous lanoline, 7 parts of white beeswax, 2 parts of stearic acid and 63 parts of a tetrahydrofurfuryl ester, with or without 1 part of Carbitol, will act as a good solvent for a halogenated fluorescein, giving improved adhesive, plasticising and emollient properties to the compositions of the invention.

An example of such a composition is as follows:

| | Parts |
|---|---|
| Solvent absorption base (as above) | 35 |
| Cocoa butter | 20 |
| Halogenated fluorescein | 2 |
| Anti-oxidant | 0.1 |
| Beeswax | 40 |

The compositions may be prepared with or without an inert lake.

The term "fatty" as used in the appended claims includes "oily" and the term "colouring" includes "staining."

I claim:

1. A cosmetic composition to be applied to the lips and face comprising a fatty base and a solution of a halogenated fluorescein in a tetrahydrofurfuryl ester.

2. A cosmetic composition to be applied to the lips and face comprising a fatty base and a solution of a halogenated fluorescein in a tetrahydrofurfuryl ester of a saturated aliphatic acid.

3. A cosmetic composition to be applied to the lips and face comprising a fatty base and solution of a halogenated fluorescein in tetrahydrofurfuryl acetate.

4. A cosmetic composition to be applied to the lips and face comprising a fatty base and a solution of a halogenated fluorescein in tetrahydrofurfuryl stearate.

5. A cosmetic composition to be applied to the lips and face comprising a fatty base and a solution of a halogenated fluorescein in a tetrahydrofurfuryl ester of an unsaturated aliphatic acid.

6. A cosmetic composition to be applied to the lips and face comprising a fatty base and a solution of a halogenated fluorescein in tetrahydrofurfuryl ricinoleate.

7. A cosmetic composition to be applied to the lips and face comprising a fatty base and a solution of a halogenated fluorescein in a tetrahydrofurfuryl ester, the tetrahydrofurfuryl ester being present in the proportion of between about 5 and 25% of the weight of the composition.

SIEGFRIED GOTTFRIED.

REFERENCES CITED

The following references are of record in the file of this patent:

UNITED STATES PATENTS

| Number | Name | Date |
|---|---|---|
| 2,153,139 | Dickey et al. | Apr. 4, 1939 |
| 2,266,540 | Fiore | Dec. 16, 1941 |

FOREIGN PATENTS

| Number | Country | Date |
|---|---|---|
| 402,296 | Great Britain | Nov. 30, 1933 |
| 822,163 | France | Sept. 11, 1937 |

OTHER REFERENCES

Lower, Mfg. Chemist, vol 18, November 1947, pages 500–503.